(12) United States Patent
Sáenz-Díez Muro et al.

(10) Patent No.: US 12,729,355 B2
(45) Date of Patent: Sep. 8, 2026

(54) SELF-CLEANING HOMOGENEOUS MIXER-BLEEDER SYSTEM

(71) Applicant: TALLERES RUIZ, S.A., Logroño (ES)

(72) Inventors: Juan Carlos Sáenz-Díez Muro, Logroño (ES); Roberto Ruiz Cabeza, Logroño (ES); Sergio Mamolar Domenech, Logroño (ES); Emilio Jiménez Macías, Logroño (ES); Julio Blanco Fernández, Logroño (ES); Eduardo Martínez Cámara, Logroño (ES); M.ª Mercedes Pérez De La Parte, Logroño (ES); Daniel Niño Martín, Logroño (ES)

(73) Assignee: TALLERES RUIZ, S.A., Logroño (ES)

( * ) Notice: Subject to any disclaimer, the term of this patent is extended or adjusted under 35 U.S.C. 154(b) by 811 days.

(21) Appl. No.: 18/005,553

(22) PCT Filed: Jul. 13, 2020

(86) PCT No.: PCT/ES2020/070456

§ 371 (c)(1),
(2) Date: Jan. 13, 2023

(87) PCT Pub. No.: WO2022/013460

PCT Pub. Date: Jan. 20, 2022

(65) Prior Publication Data

US 2023/0272314 A1 Aug. 31, 2023

(51) Int. Cl.
*C12G 1/02* (2006.01)
*B01F 33/40* (2022.01)
(Continued)

(52) U.S. Cl.
CPC ............ *C12G 1/02* (2013.01); *B01F 33/4062* (2022.01); *B01F 35/145* (2022.01); *B01F 2101/16* (2022.01); *C12G 2200/25* (2013.01)

(58) Field of Classification Search
CPC ...... C12G 1/02; C12G 2200/25; C12G 3/105; C12G 3/085; C12C 11/006; C12C 7/06;
(Continued)

(56) References Cited

U.S. PATENT DOCUMENTS 4,164,902 A * 8/1979 Maarleveld .............. C12G 1/02
99/277.1

FOREIGN PATENT DOCUMENTS

AU 4276497 4/1998
CL 47468 8/1998
(Continued)

OTHER PUBLICATIONS

International Search Report issued for International Patent Application No. PCT/ES2020/070456, dated Oct. 15, 2020 in 2 pages.
(Continued)

*Primary Examiner* — Phuong T Nguyen
(74) *Attorney, Agent, or Firm* — Knobbe, Martens, Olson & Bear, LLP

(57) ABSTRACT

A self-cleaning homogeneous mixer-bleeder system, in particular for production of a must such as a grape must by pellicular maceration, of the type incorporated in a wine maceration tank, includes a bleed system which contains a bleed manifold and a set of perforated side bleed screens, an inerting valve, and a $CO_2$ system.

4 Claims, 10 Drawing Sheets

(51) Int. Cl.
*B01F 35/10* (2022.01)
*B01F 101/16* (2022.01)

(58) Field of Classification Search
CPC ......... C12C 11/02; C12C 11/11; C12C 13/02; C12C 13/10; C12L 3/00; C12H 1/063; C12H 1/16; B01J 4/02; B01J 4/008; B01F 35/145; B01F 33/4062; B01F 2101/16
USPC ......... 99/276, 455, 467, 468, 470, 474, 485, 99/517
See application file for complete search history.

(56) References Cited

FOREIGN PATENT DOCUMENTS

| | | | |
|---|---|---|---|
| CL | 201603186 | | 5/2017 |
| CN | 206986139 | U | 9/2018 |
| EP | 2576755 | A1 | 4/2013 |
| EP | 2727476 | A1 | 5/2014 |
| EP | 3385364 | A1 | 10/2018 |
| ES | 2241985 | T3 | 11/2005 |
| ES | 2396676 | A1 | 2/2013 |
| ES | 2537612 | A1 | 6/2015 |
| ES | 2675182 | T3 | 7/2018 |
| ES | 2714952 | A1 | 5/2019 |
| FR | 2797271 | A1 | 2/2001 |
| WO | WO 2016/087966 | | 6/2016 |

OTHER PUBLICATIONS

Search Report issued in Chilean Application No. 202300104, dated Nov. 25, 2024.

Extended European Search Report issued in EP Application No. 20945343.0, dated Jan. 25, 2024.

* cited by examiner

FIG.02
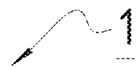
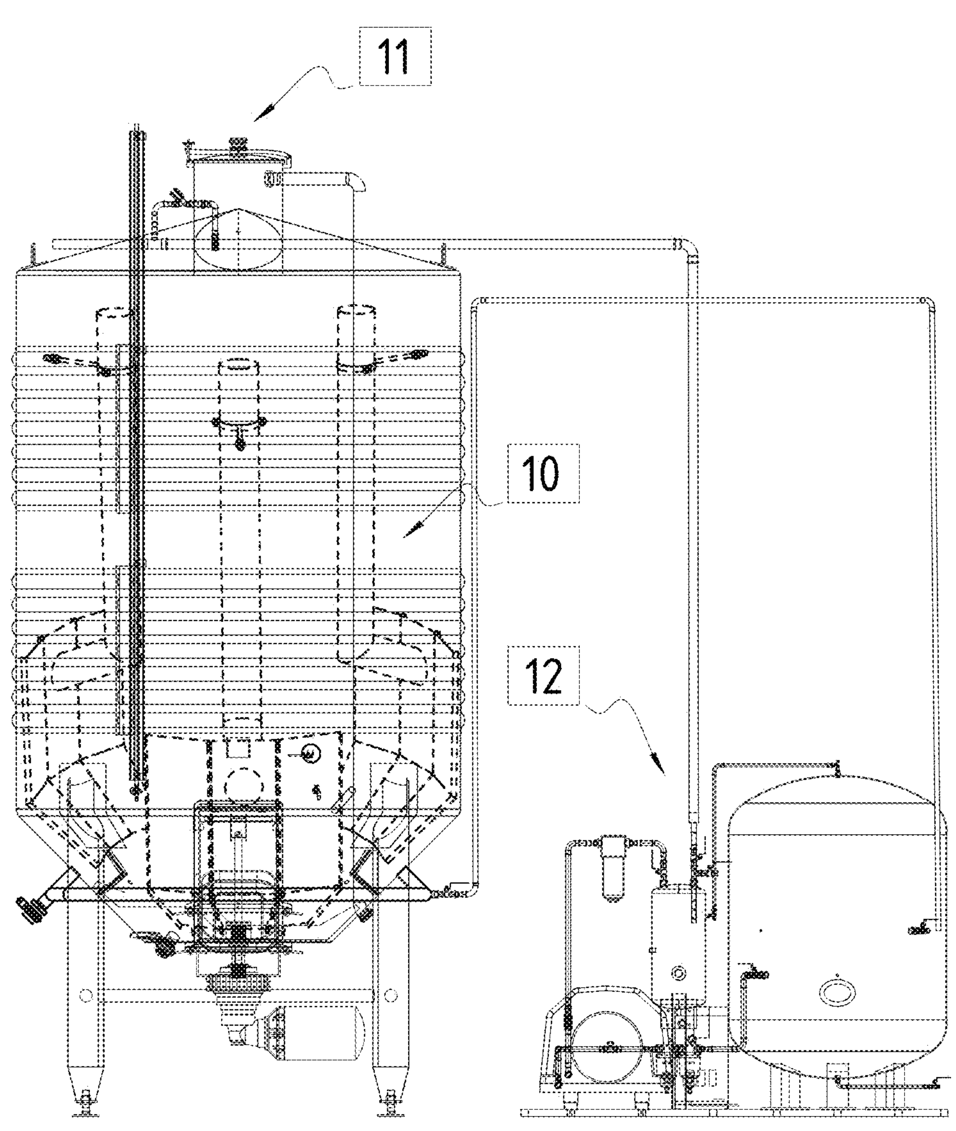

FIG.09
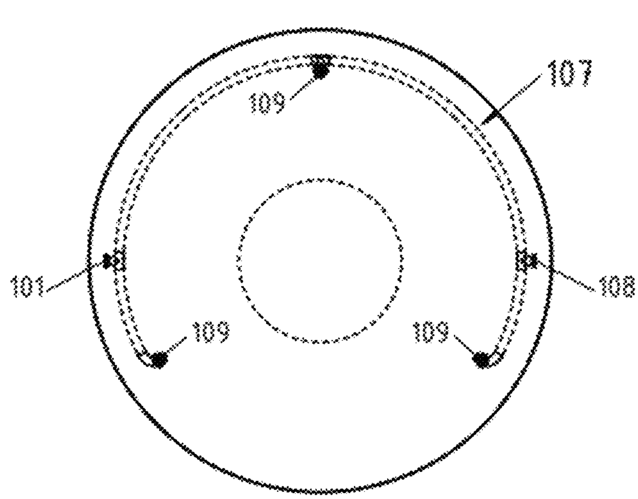
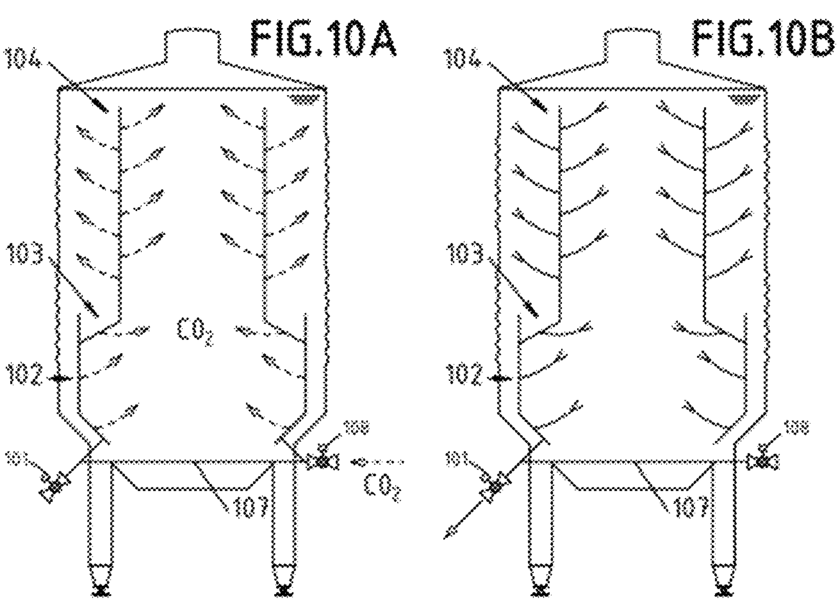

12
120
1
129
122
122
$CO_2$
$CO_2$
129
130
126
124
133
127
134
128
121
135
131
123
125
$CO_2$
132

SELF-CLEANING HOMOGENEOUS MIXER-BLEEDER SYSTEM

CROSS-REFERENCE TO RELATED APPLICATIONS

This application is the U.S. National Phase under 35. U.S.C. § 371 of International Application PCT/ES2020/070456, filed Jul. 13, 2020, the disclosure of which including the specification, the drawings, and the claims is hereby incorporated by reference in its entirety.

FIELD OF THE INVENTION

The present invention relates to new systems for being placed in a grape must extractor maceration tank for the purpose of obtaining an improved yield.

The object of the present invention consists of automatically controlled perforated bleed elements that are self-cleaning by means of injecting a countercurrent of carbon dioxide gas, $CO_2$, to improve maceration efficiency, facilitating optimal separation of the solid part in the extraction of the must, being particularly applicable for the production of white wines with pellicular maceration, although it can also be used for rosé and red wines.

The present invention belongs to the wine production sector and more specifically to a tank with improved performance for carrying out same.

BACKGROUND OF THE INVENTION

Maceration is a process in which compounds are exchanged between solid and liquid parts. It is a natural way to impart to both the liquid and the solid components new flavors and nuances that are present in either element.

In the case of wine, maceration is carried out when grape juice, referred to as must, has still not fermented and contains no alcohols. To that end, this must is mixed with the solid parts of the grape for the skins and other components to supply essentially two aspects: color and aromas. The aromatic and phenolic substances perceived in a wine originate from skins, seeds, and even stems.

The aim of maceration is not to extract the maximum amount of these elements, but rather to ensure that what goes into the must is the most optimal. Thus, and for a period of a few hours or even a week, the grape waste products are soaked in the must to impart to the future wine certain fundamental elements of any wine: anthocyanins and tannins. While anthocyanins are substances responsible for giving wine (especially red wine) its characteristic color, tannins have many other responsibilities (from the aroma to the structure of a wine, but also the roughness or astringency). In this element exchange process, there is one last protagonist: polysaccharides. These plant sugars bind with tannins to form stable complexes that affect, for example, the smoothness of a wine. Moreover, maceration times also have a direct impact on the wine: short macerations will result in wines to be consumed within a maximum of two years, while long macerations yield aged wines (since, during this maceration, the tannins they provide will be the ones that impart complexity to a given wine).

In each type of wine, maceration of the wine is carried out in a different way.

Red Wine Maceration

Red wine maceration essentially has all the elements present in grapes. Skins, seeds, and the like ferment together with the must, usually in large stainless steel or, in some cases, wood or concrete tanks. Given that the $CO_2$ given off by fermentation begins to push the solid parts to the upper region of the tanks, in order for the must to be suitably impregnated with all the substances mentioned above, it is essential to mix this solid layer with the liquid layer constantly throughout the maceration time.

Rosé Wine Maceration

In the case of rosé wine maceration, the process is performed in a uniquely different way. The wine is not fermented with the solid parts of the grape throughout the entire process, but rather the must is only in contact with the skins for a specific time (between 6 and 8 hours) and usually at a low temperature. The skins of the grapes (which are usually red grapes) impart to the must its slight pink coloring, but also nuances in flavor that will vary in intensity according to the selected grape.

White Wine Maceration

Like in the case of rosé wine, white wines only go through one contact maceration process (a few hours of mixing skins and must). Also, usually at low temperatures, this time (established by each enologist according to the characteristics and nuances of a specific wine) is the right time for the skins to impart their aromatic quality to the must.

Conventional Production of White Wine or Direct Pressing

The conventional method for the production of white wines is based on virgin fermentation, without the grape berries, in order to obtain cleaner wines. Only the liquid is fermented to achieve cleaner wines. The must for fermentation is obtained by pressure. First, the grapes are removed from the stem by means of a process referred to as destemming in which the grapes are picked from the bunch as delicately as possible so that the grapes do not deteriorate and to achieve an efficient extraction and separation so that the juices do not mix. The first musts from crushing are of the highest quality and are called yolk or flower must. The characteristics of these musts are of great finesse, with softer floral and fruity aromas. Once the wine has been destemmed, the dense must is sent to a wine maceration tank, normally made of stainless steel. The plant or hard elements of the grape such as seeds, stems or stalks, if left for a long time, would contaminate the must with undesirable odors and flavors, in addition to increasing its acid content, so when the must has acquired the desired color, maintaining a cold temperature to prevent fermentation from starting, after a few hours, the final bleeding is carried out, separating the must from the solid part.

Modern Production of White Wine or with Pellicular Maceration

Pellicular maceration is an alternative technique in the production of white wines. Approximately 30 years ago, studies were initiated at the University of California to establish the differences in the composition and quality of white wines depending on whether or not they were produced with maceration of the solid parts, specifically skins and seeds. The initial objective of this work was to try a technique that would allow a certain aging of white wines. These studies have been extended to various areas and have been maintained, although spaced out over time, up to the present time. This technique achieved varying success. As with some alternatives, they are subject to advantages and drawbacks. Depending on the grape variety, the growing area, and the parameters of maceration temperature and time, wines can be obtained with a notable improvement in quality or the opposite. Most of these studies have been focused on establishing differences in volatile compounds that can influence aroma, since one of the most evident results of pellicular maceration is the difference in the aromatic intensity of these wines compared to traditional ones. However, parallel to this fact, there is an extraction of phenolic compounds that will pass into the must and the wine. This difference in phenolic composition has been studied less and notably contributes to the organoleptic and stability differences in white wines Moreover, the most recent and increasingly more widespread methods of mechanical harvesting of grapes, which are fast and efficient and make it possible to obtain grape berries that are already without stems, require winemaking facilities and processes that are just as fast and efficient so that the entire production chain is correctly balanced, as well as speed in the processes dictated by the kinetics of the enzymatic reactions that are responsible for the deterioration in terms of must quality, especially in the case of white wine processing, as the quality of white wine is strongly conditioned by pre-fermentation operations.

In the state of the art, different types of maceration tanks for must extraction are known, with the following documents, among many others, being found in the closest art:

The patent document referred to as D01, with publication reference ES 2241985 T3, priority date: 23 Nov. 2001, entitled: "Device and process for mixing of liquid, viscous and/or pourable media", relates to a device for mixing liquid, viscous or granular media in a container, more specifically for treating the floating cap of pulp and skins in the red wine making process, with at least one gas feed line leading into a nozzle part and with a control device for controlling the discontinuous supply of gas to the nozzle part disposed within the container, with the position or the outflow direction of the nozzle part in the container being preferably discontinuously variable during operation in a precisely defined manner and the nozzle part being disposed within the container so as to be rotatable by a rotator device about an axis of rotation, the nozzle part being configured to be a plate nozzle.

The patent document referred to as D02, with publication reference ES 2675182 T3, priority date: 23 Dec. 2013, entitled: "Plant and process for obtaining clear must from grapes and for vinification", describes a plant equipped with a centrifuge separator with horizontal axis (decanter) integrated with specific equipment for homogenizing and dosing adjuvants, which operate before the treatment of the centrifugal step and that determine in a fundamental manner the performance of such a decanter centrifuge separator and of the step of clarifying through flocculation.

The patent document referred to as D03, with publication reference ES 2714952 A1, filing date: 18 May 2018, entitled: "Method and equipment for pumping over a grape harvest during maceration", relates to a method and equipment for the pressurized injection of air or other gases in a controlled manner into wine making tanks or similar for the purpose of efficiently breaking up the cap and extracting polyphenolic and aromatic compounds from the skins to the liquid portion (must) after the crushing of the grapes using the method for pumping over the grape harvest during the maceration thereof.

SUMMARY OF THE INVENTION

Prior art systems have drawbacks focusing essentially on the following aspects:

They use invasive systems with fixed nozzles or mobile lances, which are prepared to aggressively break the "marc cap", but not to perform gentle homogeneous mixing required in a pellicular maceration throughout the entire volume of the tank.

They do not allow the final bleeding, completely separating the must from the solid part, to be performed in the tank itself.

They require a great deal of operating time to perform the pellicular maceration for the solids to transfer their optimal properties to the must, running the risk of fermentation and oxidation starting.

The must extractor maceration tank (1) proposed by the invention solves in a fully satisfactory manner the drawbacks set forth above, in each and every one of the different aspects discussed. Furthermore, it does not require the modification of an existing tank for the implementation of the pellicular maceration system claimed by the invention, i.e., the invention is intended to be applied both in new tanks and in existing tanks, allowing greater extraction and higher quality of the must in less time, reducing the maceration time by 20-30% and increasing quality by 5-10% according to the Total Polyphenol Index (TPI)*. Furthermore, the following yields in white wines have been analyzed:

By means of receiving and conventional pressing with systems known in the state of the art, the following is obtained*:

| FRESH GRAPE RECEIVING | | >>> | CONVENTIONAL PRESSING | |
|---|---|---|---|---|
| 2% | STEM | | 25% | SOLIDS |
| 88% | CRUSHED GRAPE | | 35% | PRESS MUST |
| 10% | YOLK MUST | | 40% | YOLK MUST |

By means of the new must extractor maceration tank (1) proposed by the invention, the following is obtained*:

| FRESH GRAPE RECEIVING | | >>> | MACERATION OF THE INVENTION | |
|---|---|---|---|---|
| 2% | STEM | | 25% | SOLIDS |
| 88% | CRUSHED GRAPE | | 15% | PRESS MUST |
| 10% | YOLK MUST | | 60% | YOLK MUST |

As can be observed with the system claimed by the invention, 20% more yolk must is obtained, said yolk must being of a higher quality than press must.

(*) Results obtained by UNIVERSIDAD DE LA RIOJA during the 2018 and 2019 grape harvests. A campaign of in situ measurements in the must obtained in six conventional white wine maceration tanks and in six tanks with the system claimed by the present invention was carried out in each grape harvest.

BRIEF DESCRIPTION OF THE DRAWINGS

To complement the description and for the purpose of helping to better understand the features thereof, a set of illustrative and non-limiting figures, as well as a glossary with the references used in the figures along with a description of each reference, are attached as an integral part of said description.

Glossary of References and Description Thereof (0) Any prior art wine maceration tank;
(01) Top; upper part of the shell of the tank;

Figure 1:
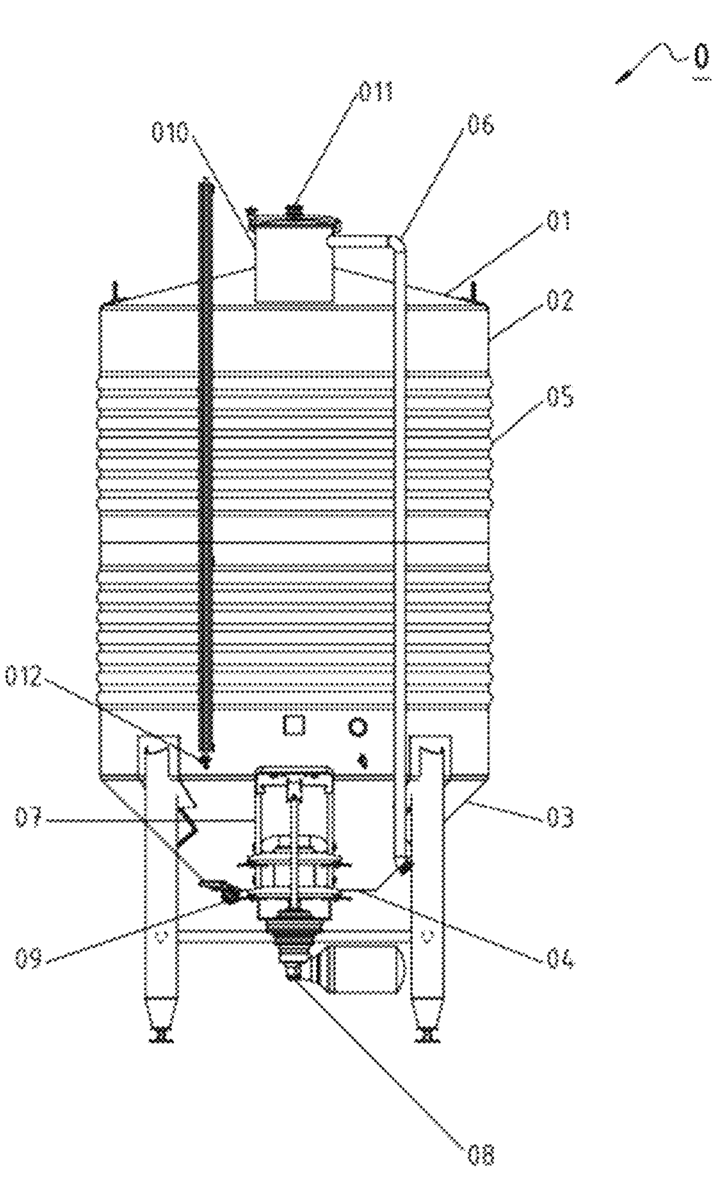

(02) Collar; cylindrical part of the shell of the tank formed by vertical cylinders;

(03) Cone; lower part of the shell of the tank or bottom having a cone shape to facilitate the exit of the dried pulp from the tank once it has been bled;

(04) Cone disc; lower part of the shell of the tank in the flat part where the elements which facilitate the emptying of the tank (blade-geared motor) are anchored;

(05) Jacket; metallic shell outside the collar which creates a chamber between the jacket and the collar inside of which forced water circulates to control the temperature of the tank;

(06) Pumping over and cleaning tube; tube which ends in the upper part of the tank in the dome which is used for tank cleaning and disinfection operations by means of recirculation in a closed circuit by connecting a pump from the total outlet;

(07) Door; opening through which a mechanism moves the door and through which the bled pulp tank is emptied;

(08) Blade-geared motor; set of mechanical elements which, as a result of the internal blade of the tank and the movement provided thereto by the geared motor, facilitates the operation of emptying the dry pulp;

(09) Total outlet; valve placed flush with the bottom in the cone disc so as to enable the complete emptying of liquid from the tank;

(010) Dome; last upper part of the tank having a cylindrical geometry containing the upper door by means of latches;

(011) Vent valve; valve placed in the upper part of the tank in the dome element which, during filling or emptying operations of the liquid in the storage tank, prevents pressurizing/depressurizing action by means of air inlet or outlet;

(012) Level strip; element for reading the tank filling level;

(1) Self-cleaning homogeneous mixer-bleeder system composed of a set of screens and a bleed manifold, object of the invention;

(10) Bleed system;

(101) Bleed valve; external connection valve of the bleed manifold (107) through which must is extracted;

(102) Perforated side bleed screen; set of screens which, by making the inner cone development and the cylindrical part of the collar, facilitate the separation of the solid part of the must;

(102*i*) Perforated left side bleed screen;

(102*c*) Perforated central side bleed screen;

(102*d*) Perforated right side bleed screen;

(103) Perforated bleed elbow; element for joining the perforated side bleed screen (102) and the perforated bleed tube (104) which provides the bleed surface;

(104) Perforated bleed tube; element placed in the innermost part of the tank which facilitates the separation of the solid part of the must in the inner part of the tank obtaining a larger bleed surface and, hence, a higher yield;

(105) Clamp; supports fixing the perforated bleed tube (104) to the tank (1);

(106) Cover; non-perforated flat element located in the upper part of the perforated bleed tube (104) which prevents the possible entry of solid particles into the bleed system;

(107) Bleed manifold; pipe outside the tank which joins all the bleed assemblies to concentrate the entire output of must in the bleed valve (101);

(108) $CO_2$ inlet valve; connection valve of the bleed manifold (107) through which $CO_2$ is provided;

(109) Screen connection element; element used for communicating the bleed manifold (107) with each of the perforated side bleed screens (102);

(11) Inerting valve; valve placed in the upper part of the tank in the dome element (010) which allows the action of pressurizing the tank (1).

(12) $CO_2$ system;

(120) Wine fermentation tank; any prior art tank existing in the wine-making facility in which $CO_2$ is produced when fermentation occurs;

(121) Delivery; delivery pipe through which $CO_2$ is conducted under pressure;

(122) Suction; suction pipe through which $CO_2$ is captured;

(123) Safety valve; safety valve in the $CO_2$ accumulator tank which prevents the possible overpressure of the accumulator tank design pressure by discharging $CO_2$;

(124) Manual shut-off valve; ball valve by means of which the pipe is shut off for maintenance or cleaning operations;

(125) Pressure gauge; analog clock placed in the accumulator tank (135) which indicates the pressure of the $CO_2$ content;

(126) Suction filter; suction filter in the pipe line before the compressors to remove particulate matter;

(127) Prefiltration; prefilter in the delivery line before the dryer to remove coarse particulate matter and moisture after compression of the captured $CO_2$;

(128) Filtration; microbial filtration of fine particulate matter to preserve aseptic $CO_2$;

(129) Seat valve; 2-way globe valve with 2 positions, pneumatically or electrically operated and controlled within the control of the system. Its function is to allow capturing or injecting $CO_2$;

(130) Trap filter; element placed in $CO_2$ suction which, as a result of the cyclone effect, precipitates enough particulate matter and moisture from $CO_2$;

(131) Pressure transducer: sensor placed in the pressurized tank which constantly measures the $CO_2$ storage pressure and sends this data to the control of the system;

(132) Pressure regulator: element which reduces the pressure of the $CO_2$ stored in the accumulator and adapts it to the $CO_2$ injection pressure;

(133) Compressor; equipment for pressurizing $CO_2$;

(134) Dryer; equipment for drying $CO_2$;

(135) Accumulator tank; tank for storing $CO_2$.

Figure 3:
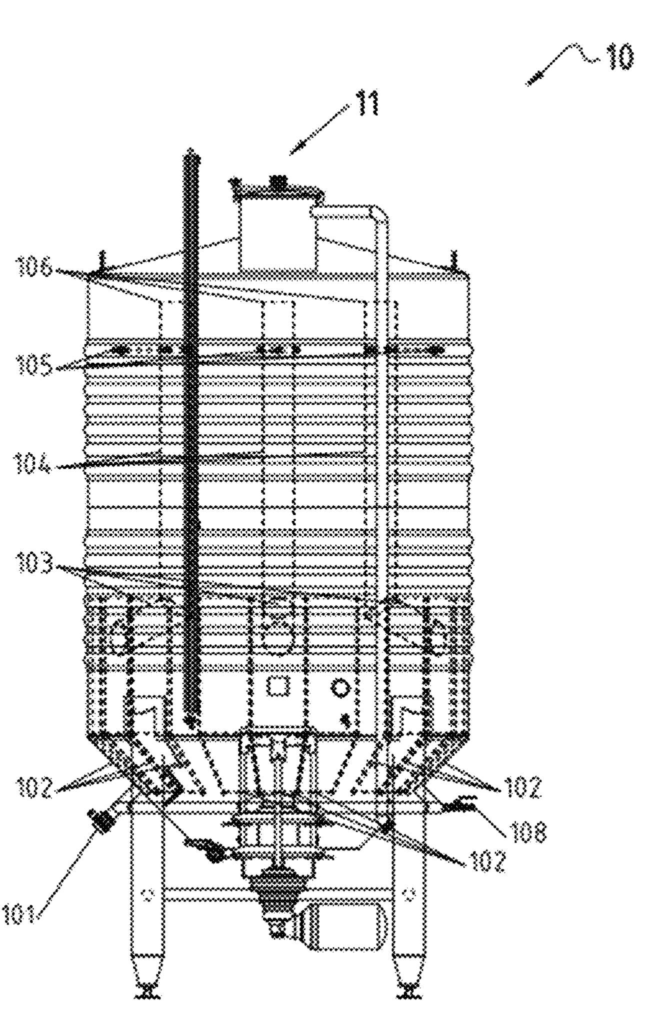
Figure 4:
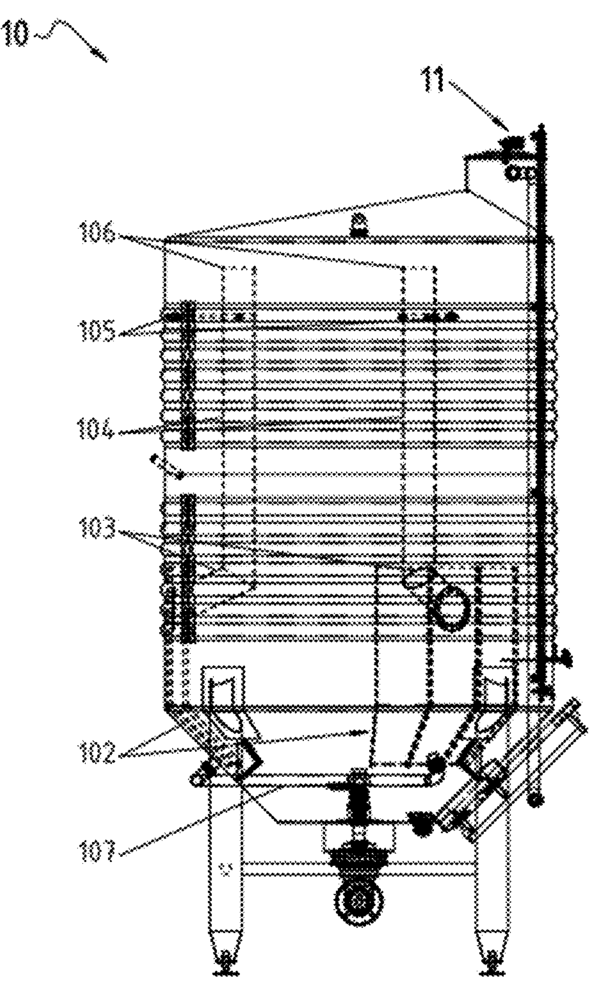
Figure 5:
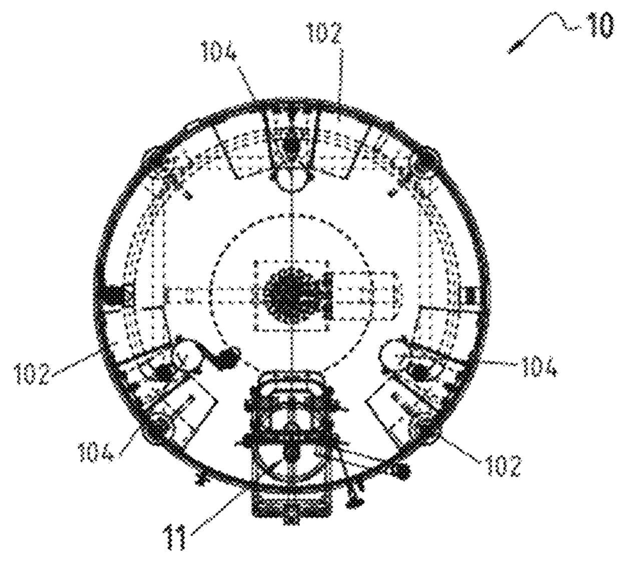
Figure 6:
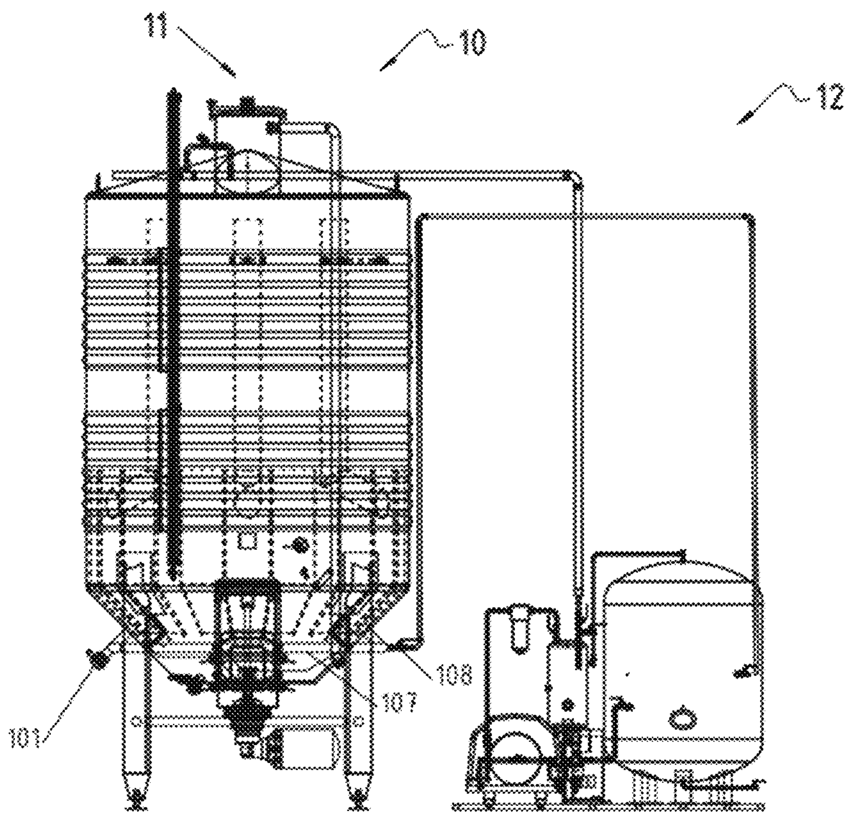

FIG. 01—shows an elevational view of any prior art wine maceration tank (0);

FIG. 02—shows a 3D infographic of a must extractor maceration tank (1), object of the invention;

FIG. 03—shows an elevational view of a self-cleaning homogeneous mixer-bleeder system composed of a set of screens and a bleed manifold (1), object of the invention, in which the bleed system (10) and the inerting valve (11) can be observed;

FIG. 04—shows a profile view of a self-cleaning homogeneous mixer-bleeder system composed of a set of screens and a bleed manifold (1), in which the bleed system (10) and the inerting valve (11) can be observed;

FIG. 05—shows a plan view of a self-cleaning homogeneous mixer-bleeder system composed of a set of screens and a bleed manifold (1), in which the bleed system (10) and the inerting valve (11) can be observed;

FIG. 06—shows an elevational view of a self-cleaning homogeneous mixer-bleeder system composed of a set of screens and a bleed manifold (1) in which, in addition to the bleed system (10) and the inerting valve (11), the $CO_2$ system (12) can be observed.

Figure 7:
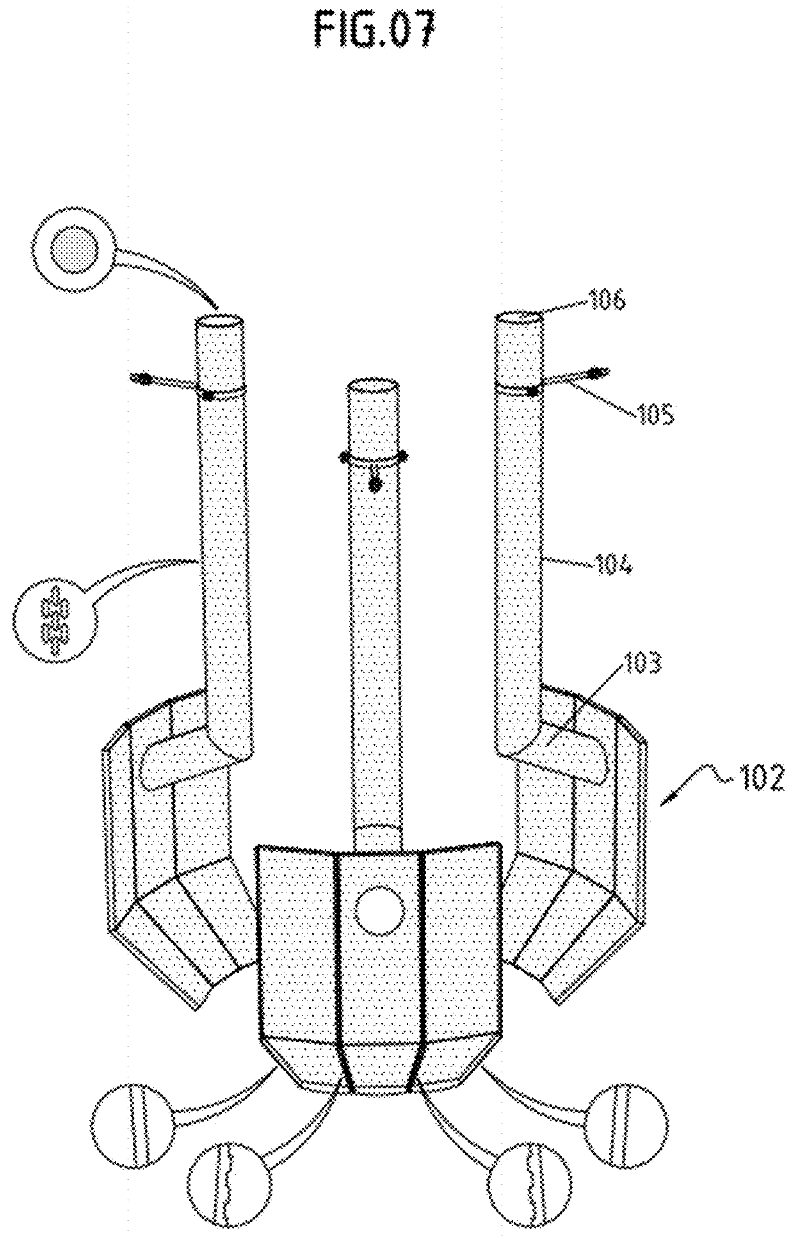

FIG. 07—shows a perspective view of the perforated elements of the bleed system (10).

Figure 8:
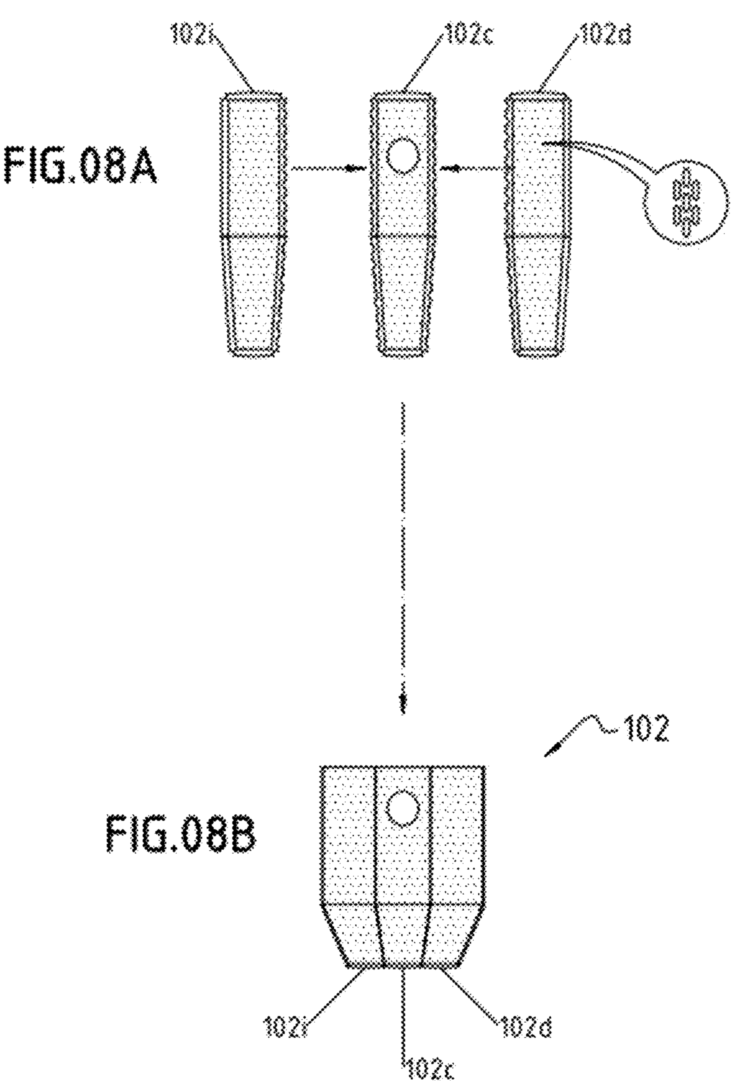

FIG. 08—FIG. 08A shows an assembly view of the three different types, according to their overall position, of perforated side bleed screens (102*i*, 102*c*, 102*d*); FIG. 08B shows the final set of a perforated side bleed screen (102).

FIG. 09—shows a bleed manifold (107) in which a bleed valve (101), a $CO_2$ inlet valve (108), and several screen connection elements (109) have been arranged.

FIG. 10—FIG. 10A shows a schematic view of the entry of $CO_2$ to simultaneously perform countercurrent cleaning of the bleed system (10) and gentle, homogeneous mixing of the solid and liquid particles; FIG. 10B shows the must bleeding operation.

Figure 11:
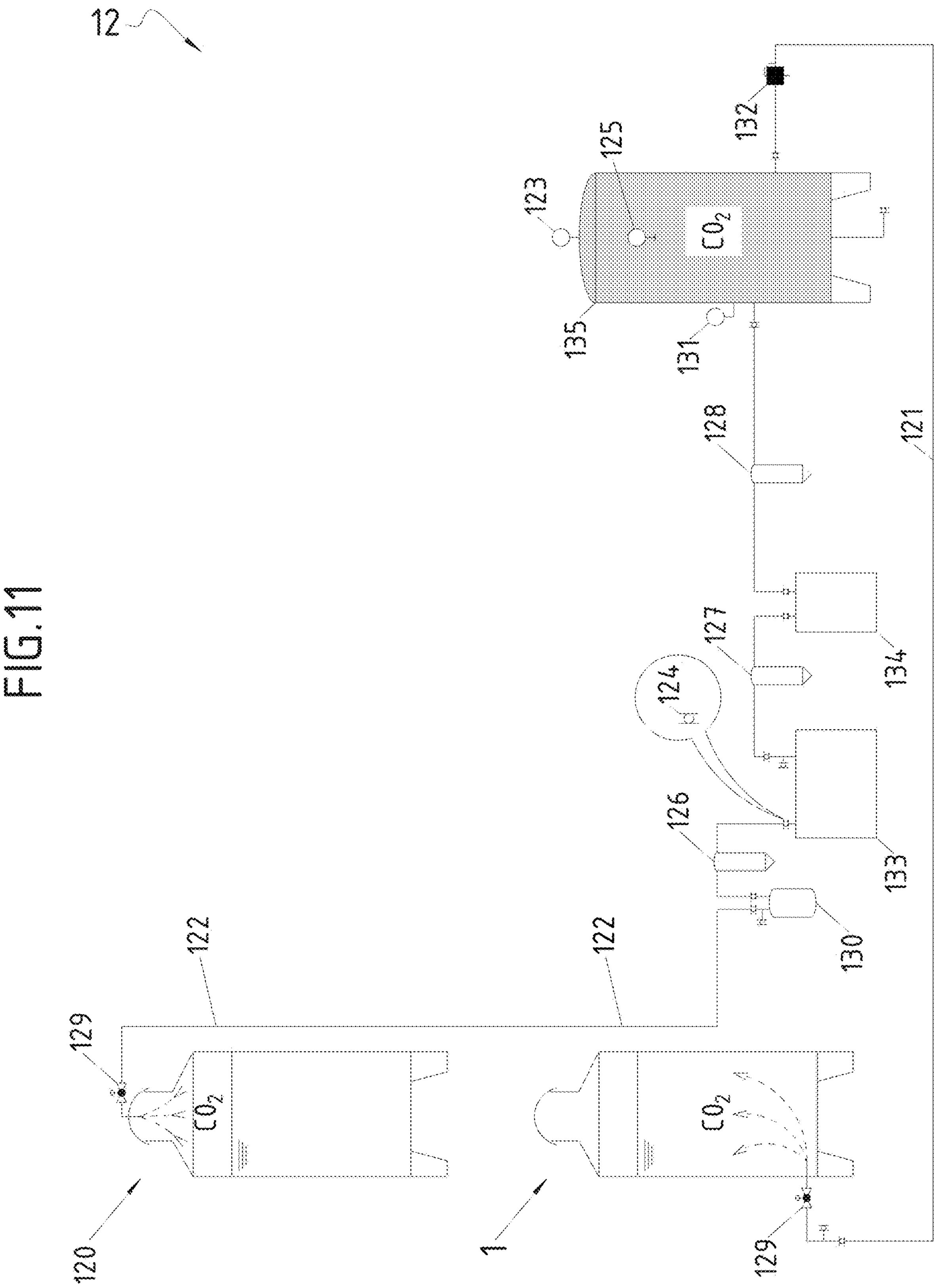

FIG. 11—shows a process diagram of a $CO_2$ system (12).

DETAILED DESCRIPTION OF THE PREFERRED EMBODIMENTS

A preferred embodiment of the invention out of the different possible alternatives is described in detail by means of listing the components thereof, as well as their functional relationship based on references to the figures, which have been included, by way of non-limiting illustration, according to the principles of the claims. Reference to the figures is made as needed to better understand what is shown therein.

Once the bunch is destemmed, the dense must (liquid plus solid elements) coming from the white grape, although it can also be rosé or even red, is sent to the must extractor maceration tank (0) equipped with a self-cleaning homogeneous mixer-bleeder system composed of a set of screens and a bleed manifold (1), preferably made of food grade stainless steel certified with European Conformity (CE) to proceed with a pellicular fermentation, maintaining a cold temperature to prevent fermentation from starting. The plant or hard elements of the grape such as seeds, stems or stalks, if left for a long time, would contaminate the must with undesirable odors and flavors, in addition to increasing its acid content. On the other hand, if left for a short time, there will not be an optimal extraction of phenolic compounds that will pass into the liquid must and consequently into the wine.

Therefore, the invention aims to perform gentle, homogeneous mixing by means of injecting $CO_2$ through the bleed system (10), throughout the entire inner volume of the must extractor maceration tank (0), to increase contact between the solid and liquid elements of the dense must required in pellicular maceration, reducing the maceration time by 20-30% and increasing quality by 5-10% according to the Total Polyphenol Index (TPI).

When the must has acquired the desired color or other measurable indices, after a certain amount of time ranging from a few hours up to one or several days, depending on the type and conditions of the grape, final bleeding is performed through the same bleed system (10) mentioned in the preceding paragraph, separating the solid part, which remains in the must extractor maceration tank (0), of the liquid must.

A bleed system composed of a set of screens and a bleed manifold (1), comprising:

a. a bleed system (10), (FIG. 01), containing:
   - a bleed manifold (107), (FIG. 03-05, FIG. 09), composed of a pipe outside the tank (0) which joins each set of perforated side bleed screens (102) by means of a screen connection element (109), and the function of which, to perform the step of bleeding the tank (0), is to concentrate the entire output of must in a manually or automatically operated bleed valve (101); it further has a $CO_2$ inlet valve (108) whereby $CO_2$ is supplied for the purpose of homogenizing the pellicular maceration, favoring the exchange of compounds between solid and liquid parts, as well as to perform a countercurrent cleaning of the perforated bleed elements (102, 103, 104); i.e., the bleed manifold (107) is an element involving inventive step as it allows both the extraction of the liquid must and the introduction of the inert $CO_2$ gas into the tank (0) in one and the same manifold.
   - a set of perforated side bleed screens (102), (FIG. 03-05, FIG. 07-08), the geometry of which follows the inner development of the cone (03) and of the cylindrical part of the collar (02), and which set is composed of: a perforated left side bleed screen (102*i*), a perforated right side bleed screen (102*d*), and a perforated central side bleed screen (102*c*), the latter screen having a hole in which a perforated bleed tube (104) is fixed by means of a perforated bleed elbow (103), and which tube (104) is arranged vertically along the inner height of the tank (0), the described set providing an optimized bleed surface facilitating the separation of the solid part of the must both at the bottom and along the entire height of the tank (0); furthermore, the perforated bleed tubes (104) are finished at the upper end thereof with respective non-perforated covers (106); it is substantially important for the covers not to be perforated, since it has been found in real conditions that if they are perforated, particles will enter and first be deposited on the covers and cause the system to become clogged; this anomaly does not occur in the rest of the perforated elements because it has been provided that the surface does not present any horizontal planes, which is an inventive element that provides substantial optimization so that gravity prevents solid particles from accumulating and, therefore, from entering the bleed system.

The set of perforated side bleed screens (102), as can be seen in FIG. 08A, is composed of, as indicated above, of a perforated left side bleed screen (102*i*), a perforated right side bleed screen (102*d*), and a perforated central side bleed screen (102*c*), to form a set of three elements, see FIG. 08B. If there are to be, e.g., five elements, for the purpose of increasing the bleed surface, adding two perforated central side bleed screens (102*c*) to the previous set will suffice, but such screens will be missing a hole since preferably, regardless of the number of elements, there will only be one perforated bleed tube (104) in each set.

Constructively speaking, each screen will be obtained by bending based on the corresponding template. As can be seen in said figure, the central screen (102*c*) has grooves in both longitudinal flaps and the end screens (102*i*, 102*d*) only have grooves in the flaps in contact with the central screen, so that the present set of screens in contact with the tank has a closed contour so that solid elements do not get in, but within that closed contour there are gaps (hence the grooves) for the free circulation of liquid.

In a preferred embodiment, the elements of the bleed system (10) will be built from food grade stainless steel certified with European Conformity (CE), and the perforated surface will be made with staggered grooves, e.g., 20×3 mm, see FIG. 07, for the purpose of increasing the liquid passage surface, but preventing solid elements (seeds, skins, etc.) from getting in. Preferably, the upper part of the perforated bleed tubes (104) will be finished with a blind cover.

FIG. 10A shows a schematic view of the must extractor maceration tank (1) in which a $CO_2$ flow is being provided through the $CO_2$ inlet valve (108), which is the connection valve of the bleed manifold (107), for the purpose of simultaneously performing countercurrent cleaning of the bleed system (10) and gentle, homogeneous mixing of the solid and liquid particles of the dense must. FIG. 10B shows the must bleeding operation, which consists of opening the bleed valve (101), which is the external connection valve of the bleed manifold (107) through which liquid must is extracted.

The operations of $CO_2$ injection and liquid must extraction use the same bleed manifold (107), so these operations must not be performed simultaneously; to that end, the $CO_2$ inlet valve (108) and the bleed valve (101) are valves which can operate both manually and automatically, controlled within the control of the system with any programmable logic controller (PLC) of the state of the art.

In another preferred embodiment, a solenoid valve controlled with the mentioned (PLC) is placed on each screen connection element (109), which is the element used for communicating the bleed manifold (107) with each of the perforated side bleed screens (102), for the purpose of being able to inject $CO_2$ only through the perforated side bleed screen (102) having its corresponding solenoid valve activated, i.e., it allows injection through one, several, or all the perforated units. The injection can also be performed sequentially through each one of them.

b. an inerting valve (11), (FIG. 03-05) which, placed in the upper part of the tank, in the dome element (010), allows, by means of $CO_2$ injected into the tank (0), the action of pressurizing the tank (0) for the purpose of removing $O_2$ and, therefore, reducing must oxidation, as well as favoring the step of bleeding when pressurization occurs in the range of 30 to 120 mbar, due to the characteristic overpressure of the inside with respect to the outside; this characteristic range extols a substantially inventive element, since it has been found in real operating conditions that values within said range substantially favor the bleeding step.

The inerting valve (11), in a preferred embodiment, will allow pressurization in a range of: min. 30 mbar and max. 120 mbar; this valve can be adjusted both manually and automatically, controlled within the control of the system with any programmable logical controller (PLC) of the state of the art.

c. a $CO_2$ system (12) (FIG. 06, FIG. 11), which is supplied with $CO_2$ by means of a suction pipe (122) in order to be stored, once pressurized and filtered, in an accumulator tank (135) for the purpose of providing $CO_2$ to the must extractor maceration tank (0) through a delivery pipe (121).

The $CO_2$ system (12) furthermore contains: a safety valve (123), which prevents the possible overpressure of the accumulator tank design pressure by discharging $CO_2$; a plurality of manual shut-off valves (124), a ball valve by means of which the pipe is shut off for maintenance or cleaning operations; a pressure gauge (125), an analog clock placed in the accumulator tank (135) which indicates the pressure of the $CO_2$ content; a suction filter (126), suction filter in the pipe line before the compressors to remove particulate matter; a prefiltration element (127), prefilter in the delivery line before the dryer to remove coarse particulate matter and moisture after compression of the captured $CO_2$; a filtration element (128), microbial filtration of fine particulate matter to preserve aseptic $CO_2$; several seat valves (129), 2-way globe valve with 2 positions, pneumatically or electrically operated and controlled within the control of the system. Its function is to allow capturing or injecting $CO_2$; a trap filter (130), element placed in $CO_2$ suction which, as a result of the cyclone effect, precipitates enough particulate matter and moisture from $CO_2$; a pressure transducer (131), sensor placed in the pressurized tank which constantly measures the $CO_2$ storage pressure and sends this data to the control of the system; a pressure regulator (132), element which reduces the pressure of the $CO_2$ stored in the accumulator and adapts it to the $CO_2$ injection pressure; a compressor (133), equipment for pressurizing $CO_2$; a dryer (134), equipment for drying $CO_2$.

In a preferred embodiment, the $CO_2$ system (12) is supplied with $CO_2$ coming from any existing wine fermentation tank (120) in a wine-making facility in which $CO_2$ is produced when fermentation occurs In another preferred embodiment, the $CO_2$ system (12) is supplied with $CO_2$ from any source known in the state of the art.

Lastly, in another preferred embodiment, $CO_2$ is supplied to the must extractor maceration tank (0) by the cone (03) and by the cone disc (04) by means of any diffuser known in the state of the art.

What is claimed is:

1. A self-cleaning homogeneous mixer-bleeder system composed of a set of screens and a bleed manifold for the production of must by pellicular maceration incorporated in a wine maceration tank, comprising:

a bleed system, which performs a gentle homogeneous mixing by means of injecting $CO_2$ through said system, throughout the entire inner volume of the must extractor maceration tank, increasing contact between the solid and liquid elements of the dense must and, therefore, contributing to reducing maceration time and to increasing the quality according to the Total Polyphenol Index, wherein the bleed system comprises:

a bleed manifold, composed of a pipe outside the tank which joins each set of perforated side bleed screens by means of a screen connection element, and the function of which, to perform the step of bleeding the tank, is to concentrate the entire output of must in a manually or automatically operated bleed valve;

a $CO_2$ inlet valve whereby $CO_2$ is supplied for the purpose of homogenizing the pellicular maceration, favoring the exchange of compounds between solid and liquid parts, as well as to perform a countercurrent cleaning of the perforated bleed elements; it is therefore possible in one and the same manifold to both extract liquid must and introduce inert $CO_2$ gas into the tank;

a set of perforated side bleed screens, the geometry of which follows the inner development of the cone and of the cylindrical part of the collar, and which set composed of: a perforated left side bleed screen, a perforated right side bleed screen, and a perforated central side bleed screen, the latter screen having a hole in which a perforated bleed tube is fixed by means of a perforated bleed elbow, and which tube is arranged vertically along the inner height of the tank, the described set providing an optimized bleed surface, facilitating the separation of the solid part of the must both at the bottom and along the entire height of the tank; furthermore, the perforated bleed tubes are finished at the upper end thereof with respective non-perforated covers;

an inerting valve which, placed in the upper part of the tank, in the dome element, allows, by means of $CO_2$ injected into the tank, the action of pressurizing the tank for the purpose of removing $O_2$ and, therefore, reducing must oxidation, as well as favoring the step of bleeding when pressurization occurs in the range of 30 to 120 mbar; and a $CO_2$ system, which is supplied with $CO_2$ by means of a suction pipe in order to be stored, once pressurized and filtered, in an accumulator tank for the purpose of providing $CO_2$ to the must extractor maceration tank through a delivery pipe.

2. The self-cleaning homogeneous mixer-bleeder system composed of a set of screens and a bleed manifold according to claim 1, wherein the supply of $CO_2$ to the must extractor maceration tank is performed by the cone and by the cone disc by means of any diffuser known in the state of the art.

3. The self-cleaning homogeneous mixer-bleeder system composed of a set of screens and a bleed manifold according to claim 1, wherein the $CO_2$ system is supplied with $CO_2$ coming from any existing wine fermentation tank in a wine-making facility in which $CO_2$ is produced when fermentation occurs.

4. The self-cleaning homogeneous mixer-bleeder system composed of a set of screens and a bleed manifold according to claim 1, wherein the $CO_2$ system is supplied with $CO_2$ from any source known in the state of the art.

* * * * *